United States Patent [19]

Vories

[11] Patent Number: 4,878,297

[45] Date of Patent: Nov. 7, 1989

[54] HYDROSTATIC LEVEL AND ELEVATION MEASURING DEVICE

[76] Inventor: Dennis L. Vories, 29142 via Piedra, Valley Center, Calif. 92082

[21] Appl. No.: 236,328

[22] Filed: Aug. 22, 1988

Related U.S. Application Data

[63] Continuation of Ser. No. 33,467, Apr. 2, 1987, abandoned.

[51] Int. Cl.[4] .............................................. G01C 5/04
[52] U.S. Cl. ..................................................... 33/366
[58] Field of Search .................. 33/366, 367, 377, 378; 73/865.2

[56] References Cited

U.S. PATENT DOCUMENTS

| | | | |
|---|---|---|---|
| 2,703,985 | 3/1955 | Jackson | 73/865.2 |
| 3,815,423 | 6/1974 | Gearhart | 73/865.2 |
| 4,145,817 | 3/1979 | Ager | 33/367 |
| 4,218,919 | 8/1980 | Stephenson et al. | 33/367 |
| 4,356,639 | 11/1982 | Opazo | 33/367 |
| 4,397,099 | 8/1983 | Gaucher et al. | 33/367 |
| 4,651,433 | 3/1987 | Mohr | 33/367 |

FOREIGN PATENT DOCUMENTS 94109   7/1980   Japan ..................................... 33/367

Primary Examiner—Harry N. Haroian
Attorney, Agent, or Firm—Brown, Martin, Haller & McClain

[57] ABSTRACT

An hydrostatic pressure sensor module is in liquid communication with a body of liquid under ambient atmospheric pressure via an elongated, flexible liquid conduit, the conduit being filled with the liquid. A transducer as a part of the sensor module converts the hydrostatic pressure developed by the liquid in the conduit at the sensor module to a signal which is a function of said pressure, the pressure being a function of sensor module elevation relative to the body of water. The signal is processed according to a transfer function which adapts it to be displayed, the gain of the transfer function being adjustable over a range in order to compensate for undesirable gain variations over an equal or lesser range, for example, due to parametric changes in components. As a part of the transfer function or separately, signal translator adjusts the signal to make it referenced to a second signal which corresponds to an arbitrarily set reference level. In one embodiment low and high elevation limit circuits give an indication, for example audible sound, when the sensor module is within adjustable preset limits.

18 Claims, 4 Drawing Sheets

1

HYDROSTATIC LEVEL AND ELEVATION MEASURING DEVICE

This is a continuation of application Ser. No. 033,467, filed Apr. 2, 1987, now abandoned.

BACKGROUND OF THE INVENTION

This invention relates in general to devices which utilize a liquid medium to reglect differences in hydrostatic pressure at different elevations, and in particular to such devices which use only one pressure transducer.

The prior art discloses manometer-type instruments which reflect differences of hydrostatic pressure at different elevations being used as levels and relative elevation measuring devices. U.S. Pat. No. 3,577,645 by Zurawski presents an open reservoir of liquid in liquid communication with a leveling head (an elongated open-top glass tube vertically oriented) via a long flexible tube. An adjustable index marker slides vertically along the glass tube. The leveling head is first placed at a reference elevation, and the reservoir is placed at a convenient elevation such that a top of a liquid column in the head is within the sliding range of the index marker which is then aligned therewith. Thereafter, the liquid column in the head will rise above or drop below the index mark whenever the head is at an elevation below or above, respectively, the reference elevation. It is disclosed as being used as a level for installing raised floors.

U.S. Pat. No. 3,117,381 by Durkin presents another manometer-type instrument for measuring land levels, the basic elements being the same as disclosed by Zurawski. U.S. Pat. No, 3,835,548 by Gearhart presents another similar device used as a level for masonry work. U.S. Pat. No. 4,041,613 by Bishop presents a similar device adapted as a level for building and engineering projects.

The previously discussed prior art does not use any pressure transducers and consequently are very limited in their range of measurable elevations for a given reservoir position. U.S. Pat. No. 4,145,817 by Ager presents a long flexible hose filled with a fluid and plugged at both ends by two pressure transducers, each transducer adapted to sense any pressure developed by the fluid at its end of the hose. Both transducers are in electrical communication with a separate control box which indicates the difference in elevation between the ends of the hose. U.S. Pat. No. 4,218,919 by Stephenson, et al., presents an elevation measuring device the basic elements of which are substantially the same as Ager's device.

Both the Ager and the Stephenson devices require two pressure transducers, one at each end of the fluid tube. This has several disadvantages when compared to a single pressure transducer device as presented herein. Firstly, having pressure sensors at both ends complicates manufacturing of the device because transducer power and/or signal writing must parallel the fluid tube and special cicuitry must be added to minimize errors due to signal wire length and differential sensor environment drift. Furthermore, a separate control module in electrical communication with both pressure sensors is required, which further complicates and increases the cost of manufacturing. Secondly, a precision pressure transducer can easily be the single most costly component in such a system, and the inclusion of two transducers can seriously impact the system retail cost. Thirdly, even transducers of identical performance (very costly) can compound system error when located in separate, different and sometimes unpredictable environments, and if the transducers are not performance matched, further errors can be added to those caused by environmental differences and compounded along therewith. Fourthly, the device as disclosed herein is easier to use than any of the prior art.

The device of this invention can be used to great advantage in place of optical levels or transits, because it is much easier to set up and use. Furthermore, this invention can be used through bushes and trees whereas such foilage would impair or prohibit the usefulness of optical levels of transits.

Other advantages and attributes of this invention will be readily discernible upon the reading of the text hereinafter.

SUMMARY OF THE INVENTION

In its full embodiment, this invention present a pressure sensor module in liquid communication with a liquid reservoir, under ambient atmospheric pressure, via a length of flexible liquid conduit. The pressure sensor module comprises a transducing means for converting the pressure, both positive and negative, developed by the liquid at the end of the conduit at which the sensor module is located, to a signal which is a function of said pressure which in turn is a function of sensor module elevation relative to the elevation of the reservoir; a transfer function means for adapting the signal to be displayed; means to adjust the gain of the transfer function means over a range in order to compensate for undersirable gain variations over said range; means for translating the signal such that it is referenced to a second signal which corresponds to a reference elevation. In a second embodiment of the pressure sensor module, adjustable low and high elevation limit circuits are adapted to make an audible noise when the sensor module is within limits.

Other objects of this invention will be readily discernible upon reading of the text hereinafter.

DESCRIPTION OF THE PREFERRED EMBODIMENT

Figure 1:
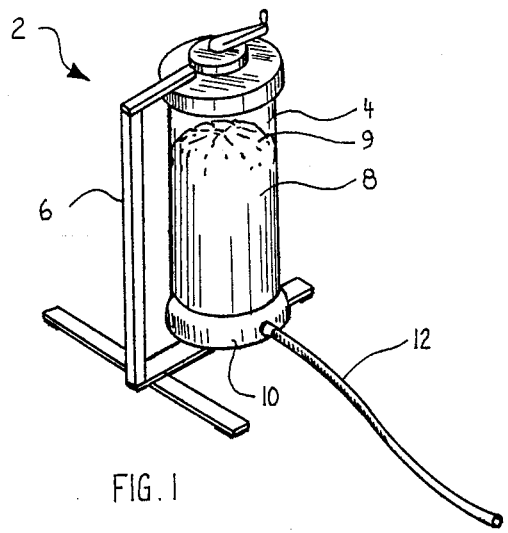
FIG. 1 is a perspective view of a reservoir.
Figure 2:
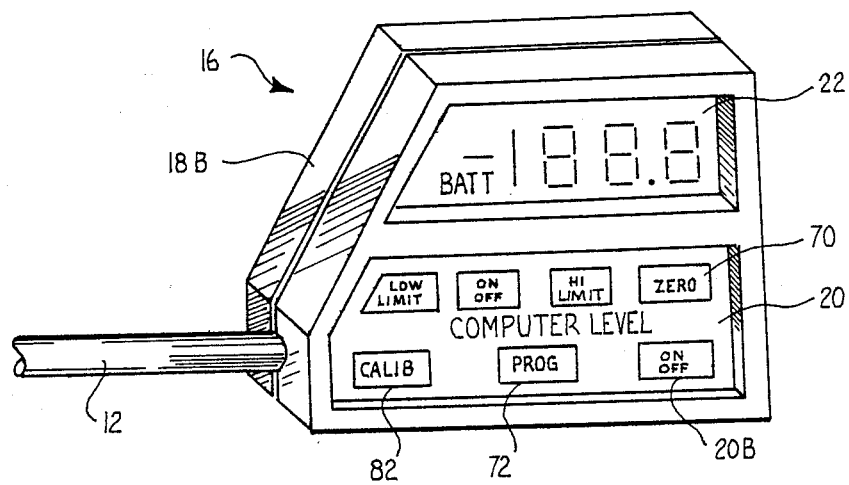
FIG. 2 is a perspective view of a second embodiment of a sensor module.

Referring to FIG. 1, a reservoir, generally designated 2, is shown to comprise a cylindrical container 4, preferably transparent or translucent, which is supported in a generally vertical position by a stand 6. The container 4 is partially filled with a body of liquid 8. At a base 10 of the container the body of liquid 8 is in liquid communication with a flexible tube 12. The other end of the tube 12 is in liquid communication with either a first embodiment 14 of a sensor module (FIG. 3) or a second embodiment 16 of the sensor module (FIG. 2). The liquid must be of substantially constant density and remain liquid under conditions of systems use. Water can be satisfactory over mild temperature ranges above freezing, but an ethylene glycol or ethylene glycol/water mix might be an appropriate liquid under general use conditions. The body of liquid 8 in the container 4 is under ambient atmospheric pressure. It can be open to the atmosphere, but preferably the body of liquid is hermetically sealed from the atmosphere by a semi-collapsed, flexible bladder 9 which prevents the liquid 8 from escaping the container 4 and air entering the liquid, but transfers the ambient pressure to the liquid.

Figure 3:
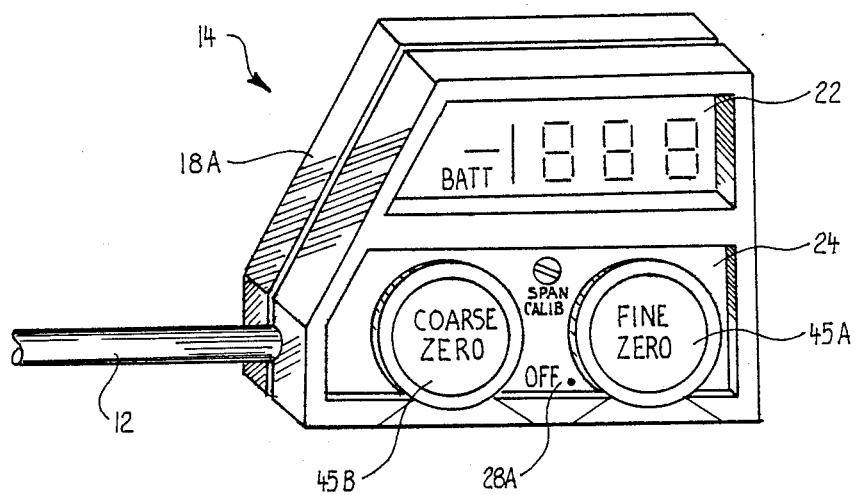
FIG. 3 is a perspective view of a first embodiment of a sensor module.

Referring to FIG. 3, the first embodiment sensor module 14 has a casing 18A with an operator's control panel 24 and a display panel 22, preferably a digital numeric display by which signed numbers can be displayed to an operator. FIG. 2 shows the second embodiment 16 to have a casing 18B with an operator's control plane 20 and the display panel 22.

Figure 5:
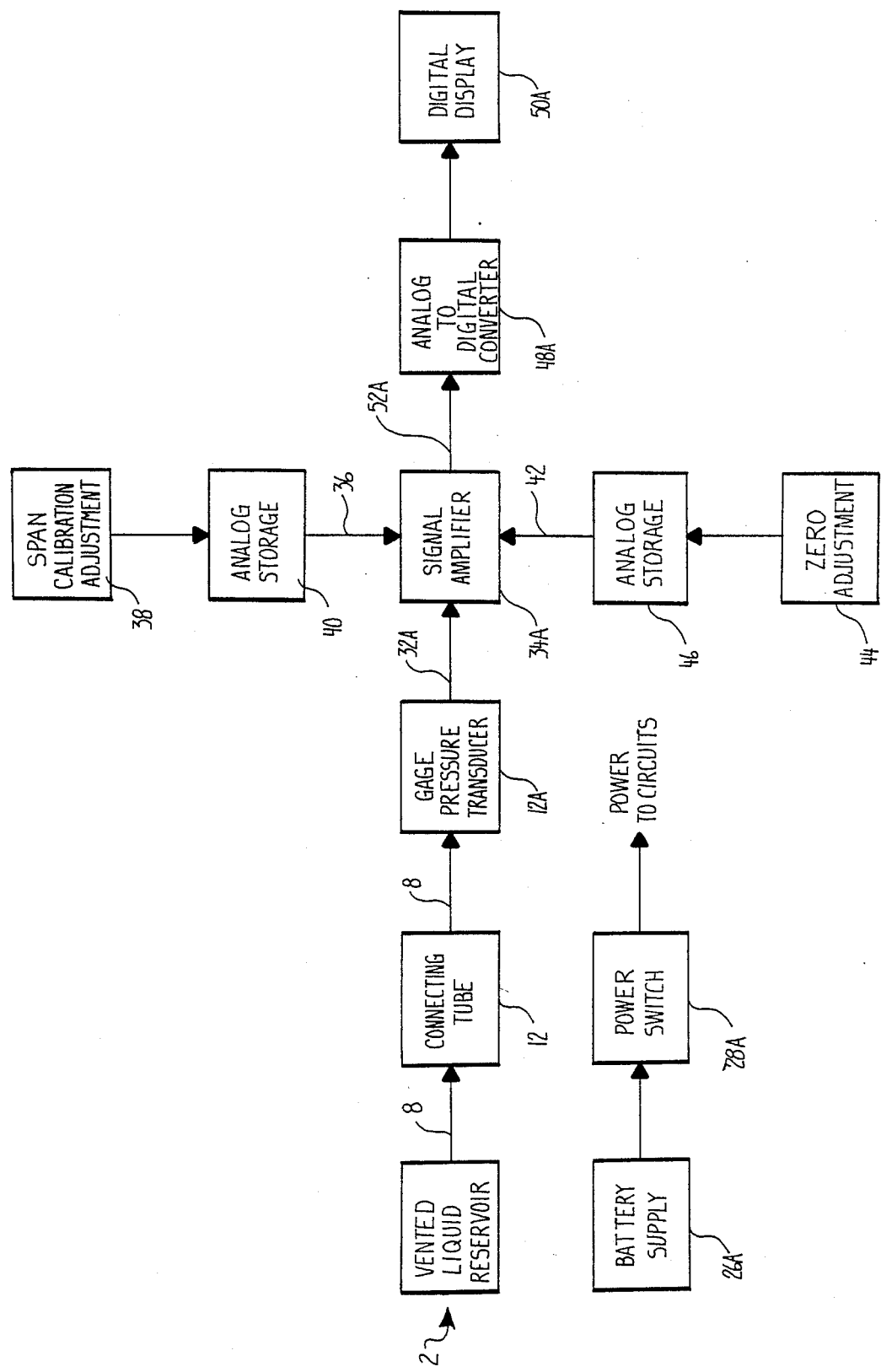
FIG. 5 is a functional block diagram of the device using the first embodiment of the sensor module.

Referring to FIG. 5, a battery 26A energizes the first embodiment sensor module 14 when a power switch 28A is closed. The liquid reservoir 12 is shown to be in liquid communication with a pressure transducer 30A through the tube 12. The pressure transducer produces an electrical signal 32A, preferably a DC (direct current) voltage the level of which is a function of any pressure or lack thereof developed by the liquid in the end of the tube at which the sensor module is located. The signal 32A represents the present elevation of the pressure sensor module 14 relative to the level of the body of liquid 8 (see FIG. 1), and the signal 32A is communicated to a signal amplifier 34A whose gain is controlled via a gain control link 36 by a span calibration means which comprises a span calibration adjustment means 38 and a memory means 40 to remember the span calibration adjustment. In the preferred embodiment the span adjustment means 38 and the memory means 40 comprise a potentiometer in a circuit in which the gain of the signal amplifier 34A is a function of the position of the potentiometer wiper, e.g. the potentiometer may be a variabvle resistance in the negative feedback circuit of an operational amplifier, or it may provide a variable voltage which controls the transfer function of an active circuit in the negative feedback circuit of an operational amplifier. The method and purpose of the span calibration will be explained hereinafter.

Referring again FIG. 5, a reference elevation establishing means is used to establish a reference signal 42, preferably a DC voltage the level of which represents a reference elevation. The reference elevation establishing means comprises a zero adjustment means 44 and a memory means 46 to remember the zero adjustment. The zero adjustment means 44 and the memory means 46 may comprise a potentiometer in a circuit the output of which is a function of the position of the potentiometer wiper, e.g. the potentiometer may be part of a voltage divider network in which the potentiometer is a variable resistance. In the preferred embodiment, there are two potentiometers, one 45A for fine adjustment and one 45B for coarse adjustment.

Referring again to FIG. 5, the reference signal 42 is subtracted by a differencing circuit from either the input of the signal amplifier 34A (present elevation signal 32A) or the input of an analog-to-digital (A/D) converter 48A which converts the signal at its input to a digital signal adapted to drive a digital display 50A. In the former case, the output signal 52A of the amplifier 34A represents the amplified signed difference between the present sensor module 14 elevation and the reference elevation. In the latter case, signal 52A represents only the amplified signal 32A. In either case, the output of the A/D 48A is a digital word representing the signed difference between the present sensor module elevation and the reference elevation.

Figure 4:
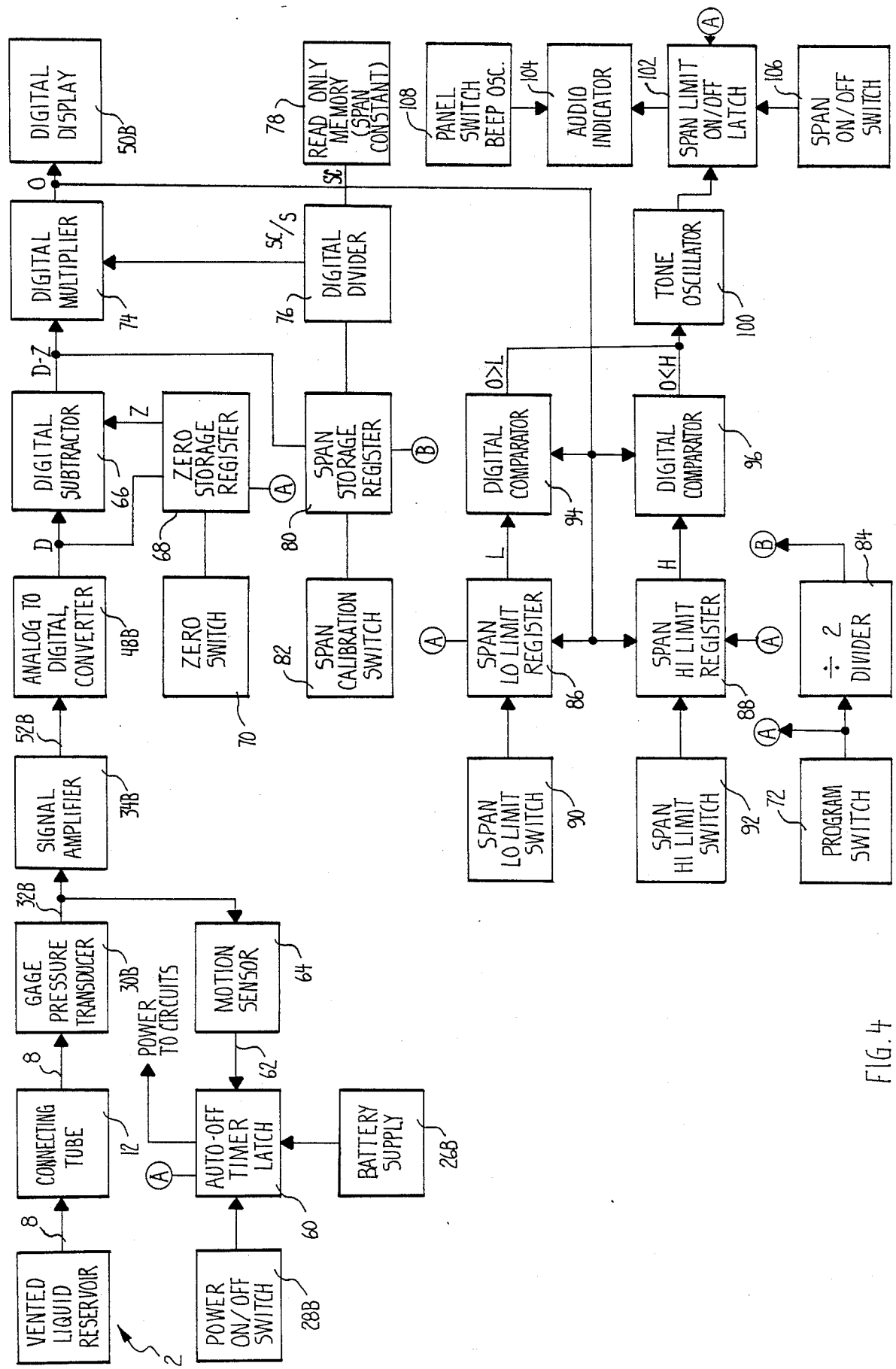
FIG. 4 is a functional block diagram of the device using the second embodiment of the sensor module.

Referring to FIG. 4, a battery 26B energizes the second embodiment sensor module 16 when a time measuring circuit, referred to an an "auto-off timer latch" 60, is initiated by a momentary closure of a power switch 28B following momentary closure of a "program" switch 72. After initiation, the time measuring circuit 60 passes the battery power to the other circuits of the sensor module 16 for a fixed period of time afterwhich it will block power to said circuits unless it is reinitiated by a signal 62 from motion sensor 64, the signal 62 being produced by the motion sensor 64 whenever the module 16 is moved. Once the time measuring means has been allowed to fully measure the fixed time period without being interupted and reinitiated by a signal from the motion sensor, it can only be reinitiated by the momentary closure of the power switch 28B. The power switch 28B also permits manual shut off of the circuits.

Referring again to FIG. 4, the liquid reservoir 2 is shown to be in liquid communication with a pressure transducer 30B through the tube 12. The pressure transducer produces an electrical signal 32B, preferably a DC voltage the level of which is a function of any pressue or lack thereof developed by the liquid in the end of the tube at which the pressure sensor module 16 is located. The motion sensor 64 can be a differentiator circuit which produces a signal in response to any change in the signal 32B from the pressure trtansducer, and such a change would occur whenever the transducer was moved vertically. The signal 32B represents the present elevation of the pressure sensor module relative to the body of liquid 8 level, and it is communicated to a signal amplifier 34B which adapts it to the input requirements of an A/D 48B. The output of the A/D 48B is a signal in the form of a digital number D which is proportional in value to the signal 32B. The signal D is communicated to an input of a digital subtractor 66 which subtracts from D a digital signal Z stored in a zero storage register 68, and the result is a digital signal designated D-Z which is the difference between D and Z. The signal Z which is stored in the register 68 is loaded into said register whenever a zero switch 70 is actuated immediately preceded by actuation of a program switch 72.

Referring again to FIG. 4, the signal D-Z is communicated to an input of a digital multiplier 74 which multiples D-Z by a digital signal designated SC/S coming from a digital divider 76. The signal SC/S is a span correction factor which effectively adjusts the overall gain of the system over a suitable range in order to compensate for undesirable system gain variations due to well known causes. The numerator term of the divider 76 is a digital signal designated SC (span constant) which is data from a read-only memory 78. The denominator is a digital signal S from the output of a span storage register 80 which is loaded with the signal D-Z during a calibration process which can be necessary due to changes in the liquid used, component aging or environmental shift. The sensor module is elevated to a factory recommended elevation above a previously established reference elevation as measured with a measuring stick, rod, tape or the like. When a calibration button 82 is pushed immediately preceded by two consecutive actuations of the program switch 72, the register 80 is loaded. A divide by two circuit 84 ensures that the program switch 72 must be actuated twice before the span storage register can be changed in order to avoid inadvertant changes.

Refering again to FIG. 4, span low limit register 86 and a span high limit register 88 are loaded with the output 0 of the multiplier 74 whenever the span low limit switch 90 and the span high limit switch 92 are respectively actuated immediately preceded by actuation of the program switch 72. The contents of these registers are communicated to a first 94 and second 96 comparator, respectively, which both compare against the signal 0. The logical "or" of the outputs of th comparators, O>L and O<H, are communicated to an input of a tone oscillator 100. If the signal O is greater than the contents of the low limit register 86 or less than the contents of the high limit register 88, the tone oscillator 100 is activated, the output being communicated through a latch 102 to an audio indicator 104 which converts the tone to audible sound. The latch 102 inhibits or passes through the tone when the span limit switch 106 is momentarily closed immediately preceded by the momentary closure of the program switch 72. The audio indicator 104 also receives an audio signal from a panel switch beep oscillator 108 which is activated momentarily anytime a panel switch is actuated.

Figure 6:
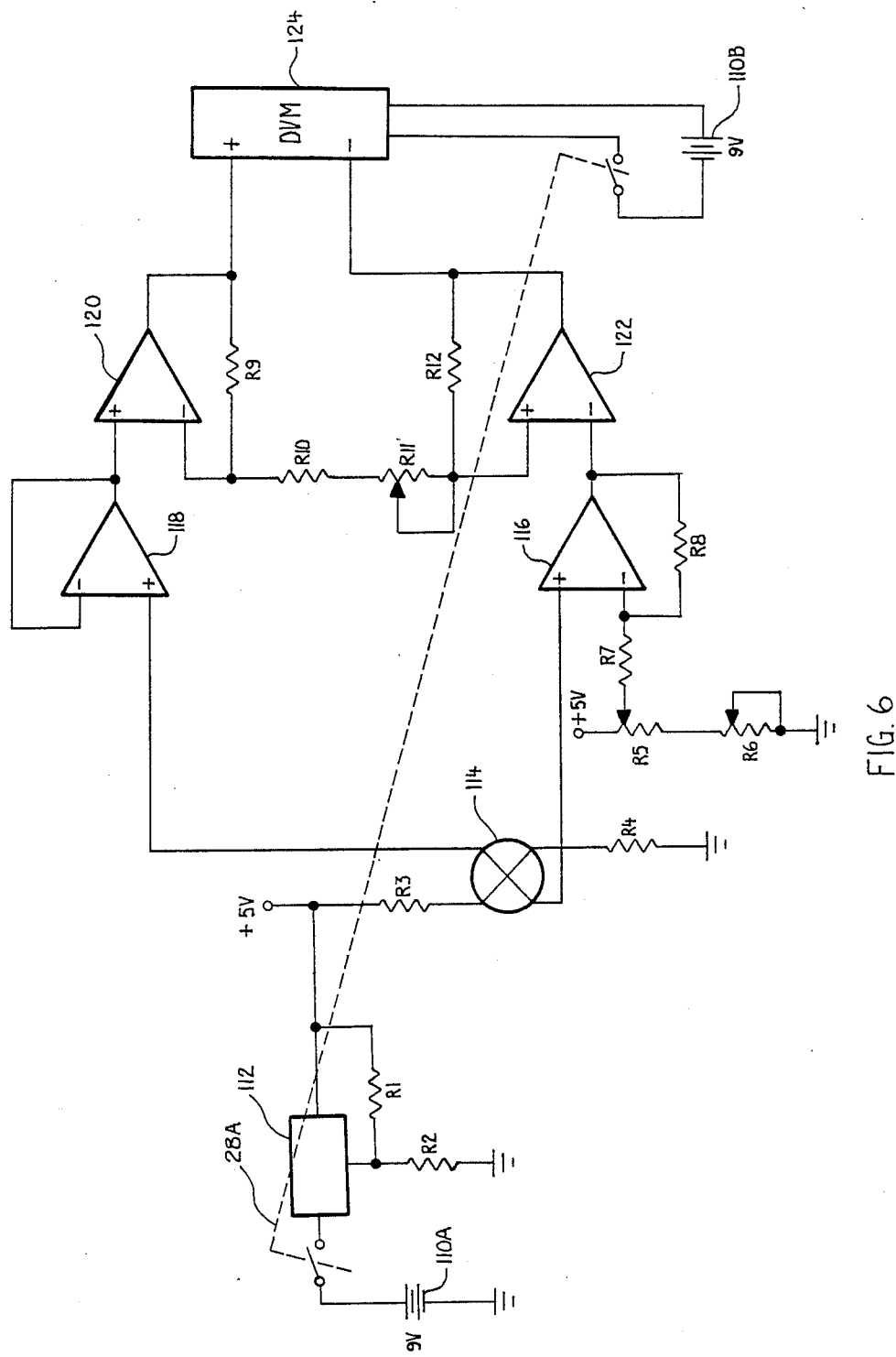
FIG. 6 is a schematic diagram of the first embodiment of the sensor module.

Referring to FIG. 6, the first embodiment 14 of the sensor module is shown to have two batteries, 110A and 110B, as its power source which is turned on and off by power switch 28A, although a single battery power source can be used. The voltage (9) from the first battery 110A is used to develope a reference voltage (5v) from a reference voltage developing circuit 112 for biasing a pressure to electrical signal transducer 114. The reference voltage developing circuit can be an integrated voltage regulator, such as a 317T, with external resistors R1 and R2. The transducer 114 is a commercially available unit, such as a MPX 2050 from Motorola, which has therein a piezoresistive element (not shown) which senses the stress induced on a diaphragm (not shown) by an external pressure and which produces an analog voltage signal in response thereto. It should be noted, however, that there are other commercially available transducers which can be used, and the selection and adaptation thereof is a matter of design choice.

Refering again to FIG. 6, the transducer is biased at generally the midpoint between the reference voltage and ground by equal resistors R3 and R4 so that the two outputs of the transduceer 114 produce a voltage differential which spans said midpoint, the voltage differential being variable in generally linear proportion to the pressure on the diaphragm. A first output of the transducer 114 is communciated to a first signal amplifier 116, preferably an operational amplifier in a noninverting configuration. The amplifier 116 has a gain set by feed back resistors R7 and R8 and an adjustable reference level which is set by a variable resistance network, R5 and R6, R5 being the coarse adjustment designated as "COARSE ZERO" 45B in FIG. 3 and R6 being the fine adjustment designated as "FINE ZERO" 45A in FIG. 3. A second output from the transducer 114 is communicated to a second operational amplifier 118 in a voltage follower configuration which is essentially an impedance transformer. The outputs from the first and second amplifiers, 116 and 118, are communicated as differential inputs to a pair of operational amplifiers, 120 and 122, cooperating as a differential amplifier whose gain is variably set by fixed resistors R9, R10, R12 and variable resistor R11, R11 being the span calibration adjustment 38 and the analog storage 40 (see FIG. 5). The differential outputs of the amplifier pair, 120 and 122, are communicated to a digitizing and display means such as a digital voltmeter (DVM) 124 which contains therein an analog to digital converter (48A of FIG. 5) and a digital display (50A of FIG. 5). Such DVM's are commercially available from sources such as Modutec.

The foregoing description and drawings were given for illustrative purposes only, it being understood that the invention is not limited to the embodiments disclosed, but is intended to embrace any and all alternatives, equivalents, modifications and rearrangements of elements falling within the scope of the invention as defined by the following claims.

I claim:

1. A relative elevation indicating device comprising an hydrostatic pressure sensor module in liquid communication with a contained body of liquid under ambient atmospheric pressure through an elongated, flexible conduit, the conduit being filled with the liquid, the sensor module comprising:
   (a) means for transducing hydrostatic pressure of the liquid at said sensor module to a signal which is a function of sensor module elevation relative to the elevation of the body of liquid;
   (b) a means for providing a reference elevation signal which is equal to a signal produced by the transducer means when the sensor module is at a selected reference elevation;
   (c) a transfer funciton means for processing the transducer signal comprising:
      (1) a means for amplifying said signal, and
      (2) a means for translating the amplified signal to make it relative to the reference elevation signal; and
   (d) means for coverting processed transducer signals to corresponding indicia readable by an operator.

2. The device according to claim wherein the transfer function means comprises an amplifier which is operative to amplify the difference between signals applied to a first and a second amplifier input, the transducer signal being applied to the first input, and said reference elevation signal being applied to the second input.

3. The device according to claim wherein the transducer signal is an analog voltage, the level of which at any given time is proportional to the difference in elevation between the sensor module and the body of liquid.

4. The device according to claim 3 wherein the means for providing the reference elevation signal is a means for providing an adjustable voltage which can be adjusted to equal the voltage produced by the transducer when the sensor module is at a selected reference elevation.

5. The device according to claim 1 further comprising a means to adjust the gain of the transfer function means to compensate for undesirable gain variations.

6. The device according to claim 5 wherein the means for amplifying the transducer signal is an amplifier with negative, adjustable feedback, and wherein the overall gain of the transfer function means is adjusted by adjusting said negative feedback.

7. The device according to claim 1 wherein the indicia comprises a digital display means, and the means for converting a processed transducer signal to a form cognizable by the display means is an analog-to-digital converter.

8. A relative elevation indicating device comprising an hydrostatic pressure sensor module in liquid communication with a contained body of liquid under ambient atmospheric pressure through an elongated, flexible conduit, the conduit being filled with the liquid, the sensor module comprising:
  (a) means for transducing hydrostatic pressure of the liquid at said sensor module to a signal which is a function of sensor module elevation relative to the elevation of the body of liquid,
  (b) a means for providing a reference elevation signal which is equal to a signal produced by the transducer means when the sensor module is at a selected reference elevation,
  (c) a transfer function means for processing the transducer signal comprising:
    (2) a means for amplifying said signal,
    (2) a means for translating the amplified signal to make it relative to the reference elevation signal, and
  (d) means responsive to processed transducer signals for indicating to an operator the elevation of the sensor module relative to the selected reference elevation.

9. The device according to claim 8 further comprising a means for digitizing the amplified transducer signal, ands wherein the means for providing a reference elevation signal comprises a digital memory in which is stored a digitized signal equal to a signal produced by the transducer and digitized by the conversion means when the sensor module is at a selected reference elevation, and wherein the means for translating the amplified signal comprises a means for subtracting from the signal output of the conversion means the signal stored in said memory.

10. The device according to claim 9 further comprising:
  (a) an operator actuated switch means for being actuated when the sensor module is at a reference elevation, and
  (b) means for storing the output of the conversion means in the memory in response to said switch means.

11. The device according to claim 9 further comprising means to adjust the gain of the transfer function means to compensate for undersirable gain variations said means comprising:
  (a) means for multiplying the output of the subtracting means by a factor,
  (b) a second digital memory having prestored therein a digital signal, the prestored digital signal being equal to the output signal of the subtracting means when the elevation of the sensor module differs from a previously established reference elevation by a known amount,
  (c) a third digital memory having stored therein a digital constant, the constant being equal to what the output signal of the subtracting means should be when the elevation of the sensor module differs from a previously established reference elevation by said known amount if no undesirable gain variations were present, and
  (d) a means for dividing the signal stored in the third digital memory by the signal stored in the second digital memory, the result being said factor.

12. The device according to claim 11 further comprising:
  (a) an operator actuated switch means for being actuated when the sensor module is at an elevation which differs from a previously established reference elevation by said known amount, and
  (b) means for storing the output of the subtracting means in the second digital memory in response to said switch means.

13. The device according to claim 12 further comprising an upper elevation, selectable limit sensing means and a lower elevation, selectable limit sensing means cooperating to give the operator an indication of when the sensor module is at an elevation within the selected upper and lower limits.

14. The device according to claim 9 further comprising an upper elevation, selectable limit sensing means and a lower elevation, selectable limit sensing means cooperating to give the operator an indication of when the sensor module is at an elevation within the selected upper and lower limits.

15. The device according to claim 11 further comprising an upper elevations, selectable limit sensing means cooperatively adapted to give the operator an indication of when the sensor module is at an elevation within the selected upper and lower limits.

16. A relative elevation indicating device comprising:
  (a) a body of liquid contained in a bladder collapsible under ambient atmospheric pressure,
  (b) an elongated, flexible liquid conduit in liquid communication with the body of liquid and filled with the liquid,
  (c) an hydrostatic pressure transducer disposed at an end of the conduit distal from the body of liquid, the transducer sensing the hydrostatic pressure developed by the liquid at said distal conduit end and producing a signal which is a function of said pressure in response thereto,
  (d) a means for translating said the transducer signal to make it relative to a second signal which is equivalent to a signal produced by the transducer at a selected reference elevation and,
  (e) a display means for displaying translated transducer signals in readable indicia corresponding to the relationship of the respective translated transducer signals to said second signal.

17. The device according to claim 1 wherein the liquid comprises at lease in part ethylene glycol to substantially lower its freezing point below that of water.

18. The device according to claim 8 wherein the liquid comprises at least in part ethylene glycol to substantially lower its freezing point below that of water.

* * * * *